Figure 1:
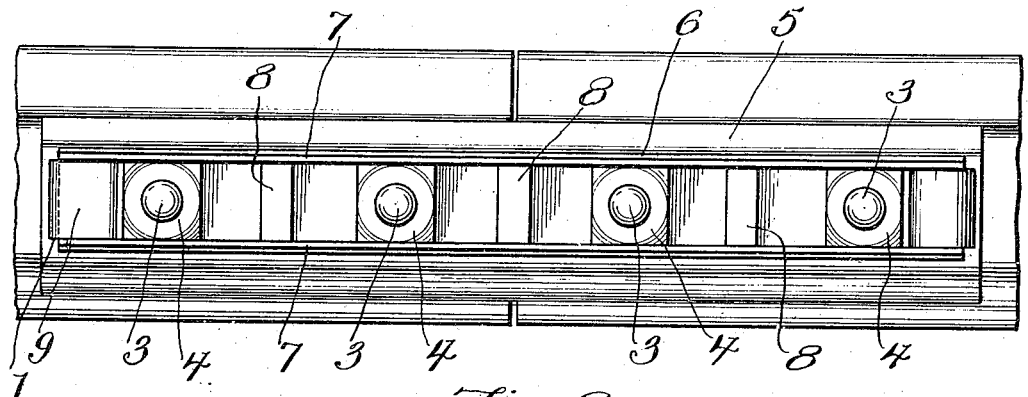

J. S. BROUGH.
NUT LOCK.
APPLICATION FILED AUG. 22, 1916.

1,263,200.

Patented Apr. 16, 1918.
2 SHEETS—SHEET 1.

Witness
J. T. L. Wright

Inventor
J. S. Brough
By Victor J. Evans
Attorney

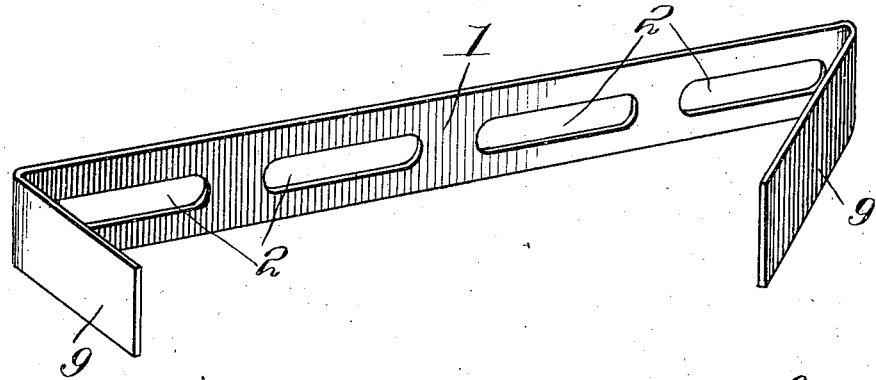
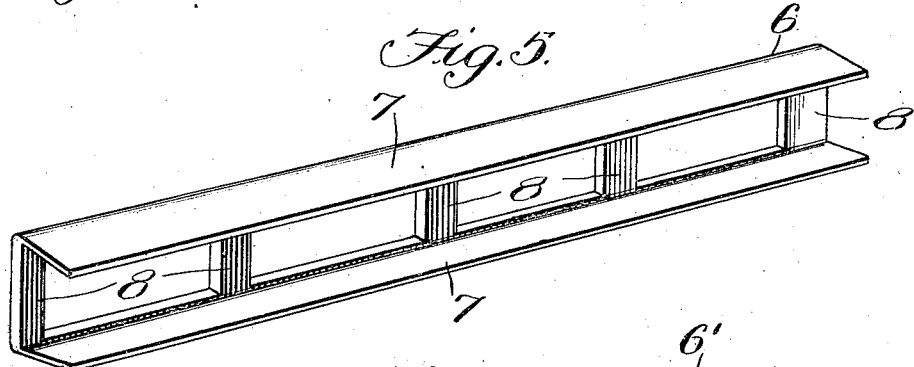
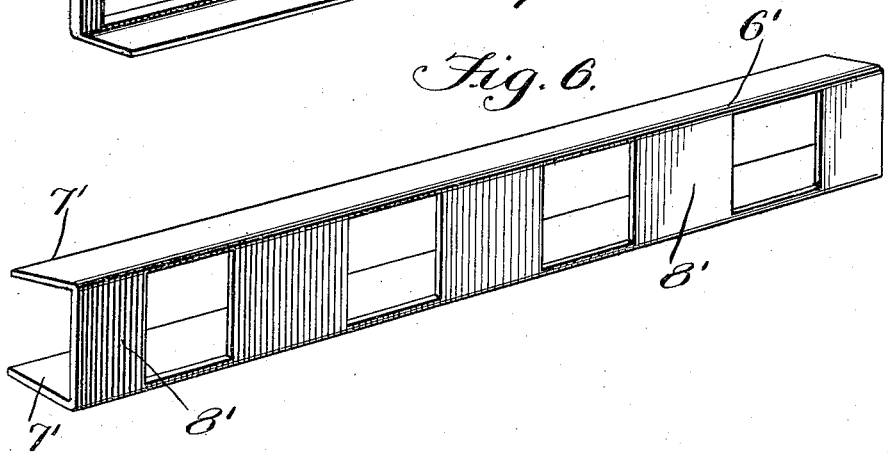

UNITED STATES PATENT OFFICE.

JOHN SANFORD BROUGH, OF REEDS, MISSOURI.

NUT-LOCK.

1,263,200. Specification of Letters Patent. Patented Apr. 16, 1918.

Application filed August 22, 1916. Serial No. 116,380.

*To all whom it may concern:*

Be it known that I, JOHN S. BROUGH, a citizen of the United States, residing at Reeds, in the county of Jasper and State of Missouri, have invented new and useful Improvements in Nut-Locks, of which the following is a specification.

This invention relates to improvements in means for holding nuts against rotation upon bolts, and consists in the construction, combination and arrangement of parts set forth in the following specification and falling within the scope of the appended claim.

Figure 2:
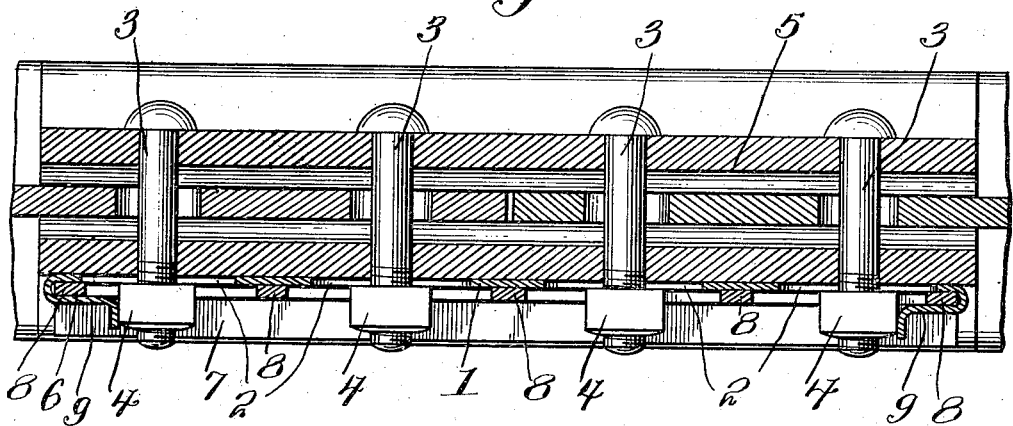
Figure 3:
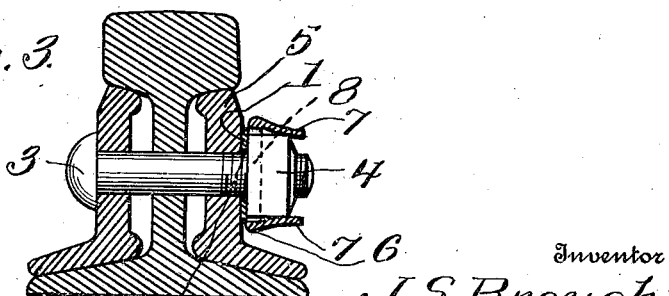

In the drawings:

Figure 1 is a view illustrating the application of the improvement upon two connected rails, Fig. 2 is a horizontal sectional view approximately on the line 2—2 of Fig. 1, Fig. 3 is a transverse sectional view approximately on the line 3—3 of Fig. 1, Fig. 4 is a perspective view of the bendable plate, Fig. 5 is a perspective view of the nut holding member, and Fig. 6 is a similar view of a slightly modified form of the nut holding member.

In carrying out my invention it is my purpose to provide an extremely simple and novel construction comprising a bendable plate 1 which is provided with openings 2 through which the bolts 3 pass, while the nuts 4 when screwed upon the bolts contact with the outer face of the plate 1 to force the same against the structure connected by the bolts and nuts.

The device is primarily adapted for use in connection with rail joints, but is equally applicable to other structures wherein a plurality of bolts are arranged in longitudinal alinement, and it is to be understood that the structure may be successfully employed upon either one or a plurality of bolts and nuts for the bolts.

The plate 1 is of a sufficient length to be extended a suitable distance beyond the outer or end nuts and bolts and will, of course, normally lie against the structure 5 connected by the bolts and nuts.

As a locking means for the bolts, I provide a member broadly indicated by the numeral 6 having spaced parallel spring flanges 7—7 which are connected at one of their edges by strips 8. The strips 8 may be thicker than the flanges 7 so that breakage of the flanges from the connecting strips 8 will be materially lessened, and the flanges strengthened. The flanges 7 are slightly beveled or inclined toward each other from their connection with the said strips 8. The distance between the strips is at all times sufficient to permit of the ready arrangement of the members 6 over the nuts 4, and the spring flanges or wings 7 exerting a tension toward each other will frictionally contact with two of the opposite sides of the nuts. When the member 6 is thus positioned, the ends of the plate 1 are turned upon themselves and bent within the chamber between the flanges or webs 7. If desired the ends of the bendable plate are contacted by one of the sides of the end nuts, as disclosed by the drawings, but such arrangement is not at all essential.

By constructing the member 6 with longitudinally arranged inclined members or flanges 7 and the spaced connecting members of a greater strength than that of the members 7 it will be noted that the device can be easily and quickly arranged upon the bolts and as the bent ends 9 of the plate 8 prevent the longitudinal movement of the locking member 6, it will be noted that the nuts will be effectively retained against accidental unscrewing from the bolts regardless of the shock or jar to which the structure connected by the said bolts is subjected.

In Fig. 6 I have illustrated the locking member 6' as formed from a single element, the spaced flanges 7' being inclined from the connecting member 8' of the said device and the connecting member 8 is, at spaced intervals, provided with cut-away portions, the distance between the adjacent walls of the same being greater than the width of the rods 4, whereby the device may be readily applied to the nuts in a manner as heretofore stated.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what I claim is:

In combination with a structure connected by bolts, a bendable plate having openings receiving the ends of the bolts and projecting beyond the said bolts, nuts screwed upon the bolts and contacting with the bendable member, of a locking means for the nut, said means including a member provided with spaced spring flanges, spaced connecting strips for one of the edges of said flanges and the said flanges being inclined toward each other from the said strips, the space between the strips being greater than the width of the nuts and the distance between the flanges being approximately equal to the width of the nuts whereby the said member may be arranged over two of the opposite sides of the nuts to permit of the flanges exerting a tension against the said sides of the nuts and the ends of the plate adapted to be bent to within the chamber of the locking member to sustain the said locking member against longitudinal movement.

In testimony whereof I affix my signature.

JOHN SANFORD BROUGH.

Copies of this patent may be obtained for five cents each, by addressing the "Commissioner of Patents, Washington, D. C."